United States Patent
Ito (10) Patent No.: US 10,079,873 B2
(45) Date of Patent: Sep. 18, 2018

(54) INFORMATION PROCESSING APPARATUS AND METHOD

(71) Applicant: CANON KABUSHIKI KAISHA, Tokyo (JP)

(72) Inventor: Mario Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 244 days.

(21) Appl. No.: 14/923,780

(22) Filed: Oct. 27, 2015

(65) Prior Publication Data

US 2016/0127446 A1 May 5, 2016

(30) Foreign Application Priority Data

Oct. 31, 2014 (JP) .................. 2014-223681

(51) Int. Cl.
*H04L 29/08* (2006.01)
*H04N 1/00* (2006.01)

(52) U.S. Cl.
CPC .......... *H04L 67/02* (2013.01); *H04N 1/0097* (2013.01); *H04N 1/00307* (2013.01); *H04N 1/00464* (2013.01); *H04N 1/00949* (2013.01)

(58) Field of Classification Search
CPC .................................................. H04L 67/02
USPC ........................................................ 709/201
See application file for complete search history.

(56) References Cited

U.S. PATENT DOCUMENTS

| 8,886,760 B2 * | 11/2014 | Jogand-Coulomb ........................ H04L 67/2847 709/219 |
| 2008/0040738 A1 * | 2/2008 | Okamoto ............... G11B 33/02 725/25 |

FOREIGN PATENT DOCUMENTS

JP 2014-115895 A 6/2014

* cited by examiner

*Primary Examiner* — Adnan Mirza
(74) *Attorney, Agent, or Firm* — Canon U.S.A., Inc. IP Division

(57) ABSTRACT

An information processing apparatus having a cooperation function for causing a first application and a second application to cooperate, the first application operating on a network, the second application operating in the information processing apparatus, includes a holding unit configured to, in a case where the cooperation function gives an instruction to call the second application, hold data from the first application in association with predetermined specifying information, and an issuance unit configured to cause the cooperation function to issue to the second application a request to acquire data from the first application, wherein according to the request, the second application performs data acquisition using the specifying information, without using communication via Hypertext Transfer Protocol (HTTP).

8 Claims, 10 Drawing Sheets

| CALLING URL | ARGUMENT DATA |
|---|---|
| http://ddd-app/printapp/doprint | PrintDataA |
| http://ddd-app/scanapp/scan | null |
| http://ddd-web/storage/save | DocumentB |

| WEB APPLICATION IDENTIFIER | REGISTRATION URL |
|---|---|
| WebApp1 | http://ddd-app/printapp/ |
| WebApp2 | http://ddd-app/scanapp/ |
| WebApp3 | http://ddd-web/storage/ |

```
1000  <script>
        function doprint(){
            var intent = new Intent("http://canon-intents/print" , "application/pdf" ,pdffile);
            window.navigator.startActivity(intent, onsuccess, onfailure);
        }
        function onsuccess(){
            alert("success");
        }
        function onfailure(){
            alert("failure");
        }
      </script>
```

FIG.10B

```
1010  <script>
        var xhr = new XMLHttpRequest();
        xhr.open("POST" , "http://canon-webapps/webapplication2/loadpostdata");
1011    if(location.hostname=="127.0.0.1" || location.hostname=="localhost" || location.hostname==deviceip){
            xhr.send(EncodeHTMLForm("isLocal=true"));
        }else{
            var intent = window.intent;
            var data = window.intent.data;
            xhr.send(EncodeHTMLForm(data));
        }
      </script>
```

INFORMATION PROCESSING APPARATUS AND METHOD

BACKGROUND OF THE INVENTION

Field of the Invention

The present invention relates to an information processing apparatus including a web browser for displaying an operation screen provided by a web server.

Description of the Related Art

Generally, it is known that an information processing apparatus such as a personal computer (PC) is connected to a web server on a network and displays, on a web browser included in the information processing apparatus, an operation screen provided by a web application on the web server.

In this case, first, the web browser of the information processing apparatus requests the operation screen from the web application on the web server. Then, the web application responds to the request from the information processing apparatus by transmitting, to the information processing apparatus, HyperText Markup Language (HTML) data for displaying the operation screen on the web browser. The web browser of the information processing apparatus analyzes the received HTML data and displays the operation screen based on the description of the HTML data. Further, if a user inputs an instruction through the operation screen displayed on the web browser, the web browser notifies the web server of the input instruction. Then, the web application on the web server having received the notification performs processing according to the instruction input by the user.

Further, if there is a plurality of such web applications, a method is considered where a web application calls another web application in a remote procedure call (RPC) manner, and the web applications are caused to cooperate. This is a web application cooperation function typified by Web Intents. The use of this function enables a certain web application to directly call another web application. This can improve the convenience of a user.

Further, in recent years, some information processing systems such as a multifunction peripheral (MFP) including a scanner and a printer, a smartphone, and an in-car automotive navigation system also include a web browser.

Further, as discussed in Japanese Patent Application Laid-Open No. 2014-115895, the mounting of a mechanism for performing application cooperation as in Web Intents is also considered. In the mechanism of such application cooperation, a calling source web application can transfer an argument to a calling destination web application to call processing. Specifically, in application cooperation, an argument is transferred from the web content of a calling source web application loaded on a web browser to the web content of a calling destination web application loaded on the web browser. At this time, to transmit argument data to the calling destination web application, the calling source web application loaded on the web browser needs to perform Hypertext Transfer Protocol (HTTP) communication.

Incidentally, there are some information processing apparatuses which have a server function in addition to a web browser function, and on which a web application operates. Consequently, it is possible to describe, using web technology, a screen of an application provided by an information processing apparatus. Thus, it is easier to develop an application than an embedded application. Further, if an embedded application is such a web application, it is also easy to access the web application from outside the information processing apparatus.

In an application cooperation function, however, to transfer argument data from a calling source web application to a calling destination web application on a server, it is necessary to transmit the argument data using HTTP communication from JavaScript (registered trademark). Particularly, if a web browser and a web application are present in the same device, the processing cost for the acquisition of argument data is higher than in the case of the cooperation of normal embedded applications.

SUMMARY OF THE INVENTION

According to an aspect of the present invention, an information processing apparatus having a cooperation function for causing a first application and a second application to cooperate, the first application operating on a network, the second application operating in the information processing apparatus, includes a holding unit configured to, in a case where the cooperation function gives an instruction to call the second application, hold data from the first application in association with predetermined specifying information, and an issuance unit configured to cause the cooperation function to issue to the second application a request to acquire data from the first application, wherein according to the request, the second application performs data acquisition using the specifying information, without using communication via Hypertext Transfer Protocol (HTTP).

Further features of the present invention will become apparent from the following description of exemplary embodiments with reference to the attached drawings.

DESCRIPTION OF THE EMBODIMENTS

Exemplary embodiments for carrying out the present invention will be described below with reference to the drawings.

Figure 1:
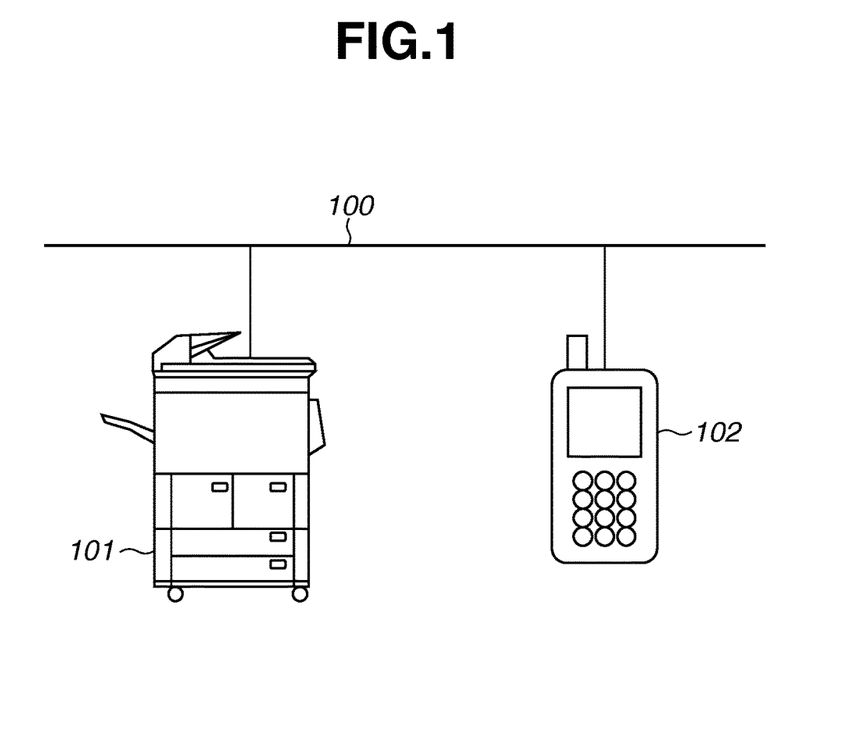
FIG. 1 is a diagram illustrating an overall configuration of a system in which information processing apparatuses are connected together.

A first exemplary embodiment is described. FIG. 1 is a diagram illustrating the overall configuration of an information processing system. The information processing system illustrated in FIG. 1 includes information processing apparatuses 101 and 102, which are connected together via a network 100. The network 100 is the foundation on which the apparatuses communicate with each other, and may be a wired or wireless local area network (LAN) or the Internet. Then, if communication is performed via the Internet, a gateway (not illustrated) is present between the network 100 and the information processing apparatuses 101 and 102 and performs address translation. For example, the gateway includes a router. Each of the information processing apparatuses 101 and 102 may be an image forming apparatus (a multifunction peripheral), an in-car automotive navigation system, a smartphone, or a robot so long as the information processing apparatus has a web browser function. Further, in the present exemplary embodiment, as illustrated in FIG. 1, the number of connected information processing apparatuses is not limited. Alternatively, a plurality of various information processing apparatuses may be connected together.

Figure 2:
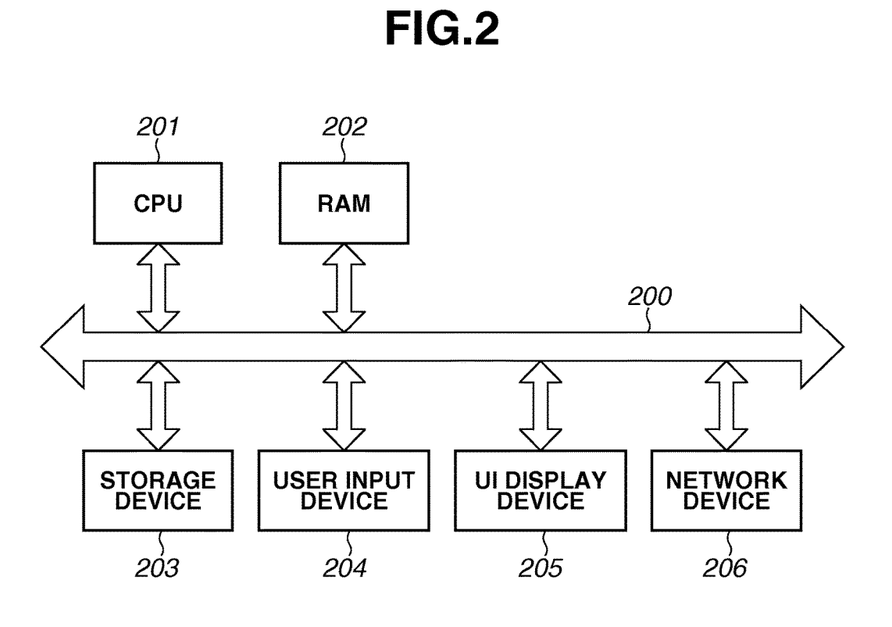
FIG. 2 is a block diagram illustrating a hardware configuration of each information processing apparatus.

FIG. 2 is a block diagram illustrating the hardware configuration of each of the information processing apparatuses 101 and 102 according to the present exemplary embodiment. Each of the information processing apparatuses 101 and 102 includes a central processing unit (CPU) 201, which controls processing according to the present exemplary embodiment, and a random-access memory (RAM) 202, which provides a work area for the CPU 201. Each of the information processing apparatuses 101 and 102 also includes a storage device 203, which stores a program and various settings, a user input device 204, with which a user inputs a command, a user interface (UI) display device 205, which displays a screen, a network device 206, which communicates with another device via the network 100, and a main bus 200. In the present exemplary embodiment, unless otherwise noted, in the information processing apparatus 101, the CPU 201 controls the RAM 202, the storage device 203, the user input device 204, the UI display device 205, and the network device 206 via the main bus 200.

Further, the storage device 203 may be a hard disk drive (HDD) or a non-volatile random-access memory (NVRAM). The UI display device 205 may double as the user input device 204 as in a touch panel display. Further, a device-specific apparatus such as an image reading apparatus, an image printing apparatus, or a Global Positioning System (GPS) module may be attached to the information processing apparatus, depending on the type of the information processing apparatus.

Figure 3:
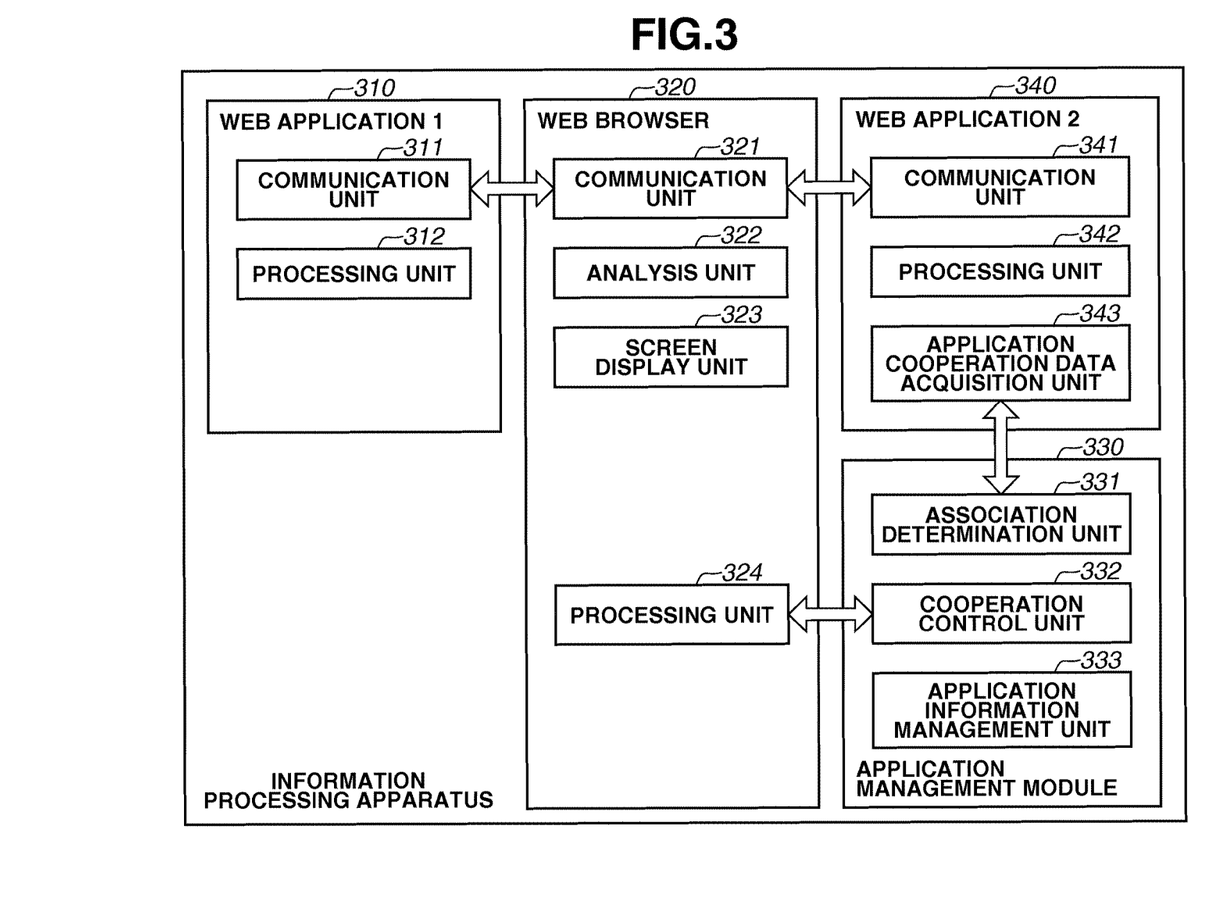
FIG. 3 is a block diagram illustrating a software configuration of one of the information processing apparatuses.

FIG. 3 is a block diagram illustrating the software configuration of the information processing apparatus 101 according to the present exemplary embodiment. Function units illustrated in FIG. 3 are achieved by the CPU 201 of the information processing apparatus 101 executing a control program. The information processing apparatus 101 includes a web application 310, a web application 340, a web browser 320, and an application management module 330. The information processing apparatus 102 according to the present exemplary embodiment has a configuration similar to that of the information processing apparatus 101. If, however, the information processing apparatus 102 has a web browser function and a web application cooperation function, the information processing apparatus 102 may not need to have other functions. Examples of the achievement of the cooperation function include "Web Intents", "Web Activities", and another method using a unique application programming interface (API) having a similar function.

The web application 310 includes a communication unit 311 and a processing unit 312. The communication unit 311 is a software module for controlling the network device 206 to perform communication according to the Hypertext Transfer Protocol (HTTP) protocol. The processing unit 312 receives a request from the web browser 320 via the communication unit 311 and performs processing. Specifically, the processing unit 312 receives, via the communication unit 311, input information input by the user through an operation screen displayed on the web browser 320. Then, according to the received input information, the processing unit 312 transmits an operation screen or a result screen to be displayed on the web browser 320 and causes a function (not illustrated) specific to the information processing apparatus to operate.

The web browser 320 includes a communication unit 321, an analysis unit 322, a screen display unit 323, and a processing unit 324. The communication unit 321 communicates with the web application 310 and the web application 340 via the network device 206 according to the HTTP protocol. Specifically, the communication unit 321 transmits, as a request to the web application 310 and the web application 340, information input through an operation screen displayed on the web browser 320. Further, the communication unit 321 receives a response transmitted from the web application 310 and the web application 340. Based on the result of analysis by the analysis unit 322 or the result of execution of JavaScript (registered trademark) by the processing unit 324, the screen display unit 323 displays an operation screen on the UI display device 205 based on HTML data.

Based on the result of analysis by the analysis unit 322, the processing unit 324 executes JavaScript (registered trademark) or performs a function (not illustrated) specific to the information processing apparatus. Particularly, in a response acquired from the web application 310, application cooperation function calling JavaScript (registered trademark) 1000 is described. Then, according to the application cooperation function calling JavaScript (registered trademark) 1000, the processing unit 324 requests a cooperation control unit 332 of the application management module 330 to start application cooperation.

Further, in a response acquired from the web application 340, argument data transmission JavaScript (registered trademark) 1010 is described. According to the argument data transmission JavaScript (registered trademark) 1010, the processing unit 324 acquires argument data of application cooperation from the cooperation control unit 332 of the application management module 330 and transmits the argument data to the web application 340. The application cooperation function calling JavaScript (registered trademark) 1000 and the argument data transmission JavaScript (registered trademark) 1010 will be described later with reference to FIGS. 10A and 10B.

The application management module 330 provides the function of causing web applications to cooperate. The application management module 330 includes an association determination unit 331, the cooperation control unit 332, and an application information management unit 333. According to a request from a web application, the association determination unit 331 transfers argument data for cooperation to the web application. At this time, the request from the web application includes the identifier of the web application. Based on information stored in the application information management unit 333 and the identifier of the web application, the association determination unit 331 automatically associates the argument data to be transferred to the web application.

Then, information indicating the relation between the identifier and the uniform resource locator (URL) of the web application is saved as a web application registration information table 810 in the application information management unit 333. Further, when an application cooperation function is called, the URL of a calling destination web application and an argument are saved as an argument data management table 800 in the application information management unit 333.

There may be a plurality of pieces of argument data, depending on the calling state of the application cooperation function. Thus, the association determination unit 331 confirms prefix match with respect to the URLs of the pieces of argument data and associates the URLs. For example, if the identifier to be transferred is "WebApp1", the registration URL "http://canon-app/printapp/", of which the identifier is described on the line of "WebApp1", is acquired from the web application registration information table 810. Then, the argument data "PrintDataA" on a line including a calling URL that satisfies a prefix matching with the acquired URL is acquired from the argument data management table 800 and transferred to the web application.

Based on a request from the processing unit 324 of the web browser 320, the cooperation control unit 332 starts application cooperation. Specifically, the cooperation control unit 332 receives a request from the processing unit 324 and then registers, in the argument data management table 800 of the application information management unit 333, the URL of a calling destination web application and argument data that are included in the request. Then, the cooperation control unit 332 instructs the processing unit 324 of the web browser 320 to open a new tab and load the content of the calling destination web application.

Further, if an argument data acquisition request is received from the processing unit 324, the cooperation control unit 332 transfers argument data registered in the application information management unit 333 to the processing unit 324. Further, if the execution of a calling destination web application ends, the cooperation control unit 332 receives the processing result from the calling destination web application and transfers the received processing result to a calling source web application.

Figure 8A:
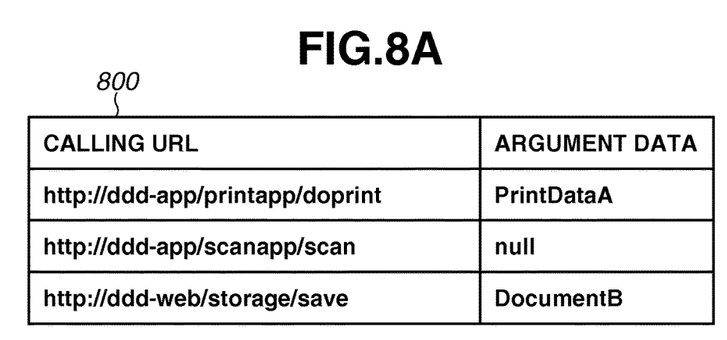
FIGS. 8A and 8B are diagrams illustrating an example of a data management table and an application registration information table.
Figure 8B:
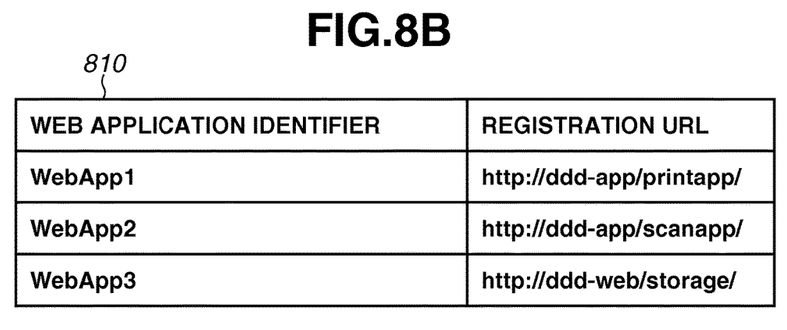

The application information management unit 333 holds the argument data management table 800, which is illustrated in FIG. 8A, and the web application registration information table 810, which is illustrated in FIG. 8B, and stores information related to a web application and application cooperation. Based on a request from the cooperation control unit 332, the application information management unit 333 reads information from the tables and writes information to the tables. In the present exemplary embodiment, the application management module 330 is present independently of the web browser 320, but may be present as part of the function of an operating system (OS) or present in the web browser 320.

The web application 340 includes a communication unit 341, a processing unit 342, and an application cooperation data acquisition unit 343. The communication unit 341 is a software module for controlling the network device 206 to perform communication according to the HTTP protocol. The processing unit 342 receives a request from the web browser 320 via the communication unit 341 and performs processing. Specifically, the processing unit 342 receives, via the communication unit 341, input information (a request) input by the user through an operation screen displayed on the web browser 320. Further, according to the received input information, the processing unit 342 transmits as a response an operation screen or a result screen to be displayed on the web browser 320 and causes a function (not illustrated) specific to the information processing apparatus to operate. If a screen acquisition request is received from the web browser 320, the application cooperation data acquisition unit 343 makes an argument data acquisition request to the association determination unit 331 of the application management module 330. The details of the application cooperation data acquisition unit 343 will be described later with reference to FIGS. 4, 5, and 7.

Figure 4:
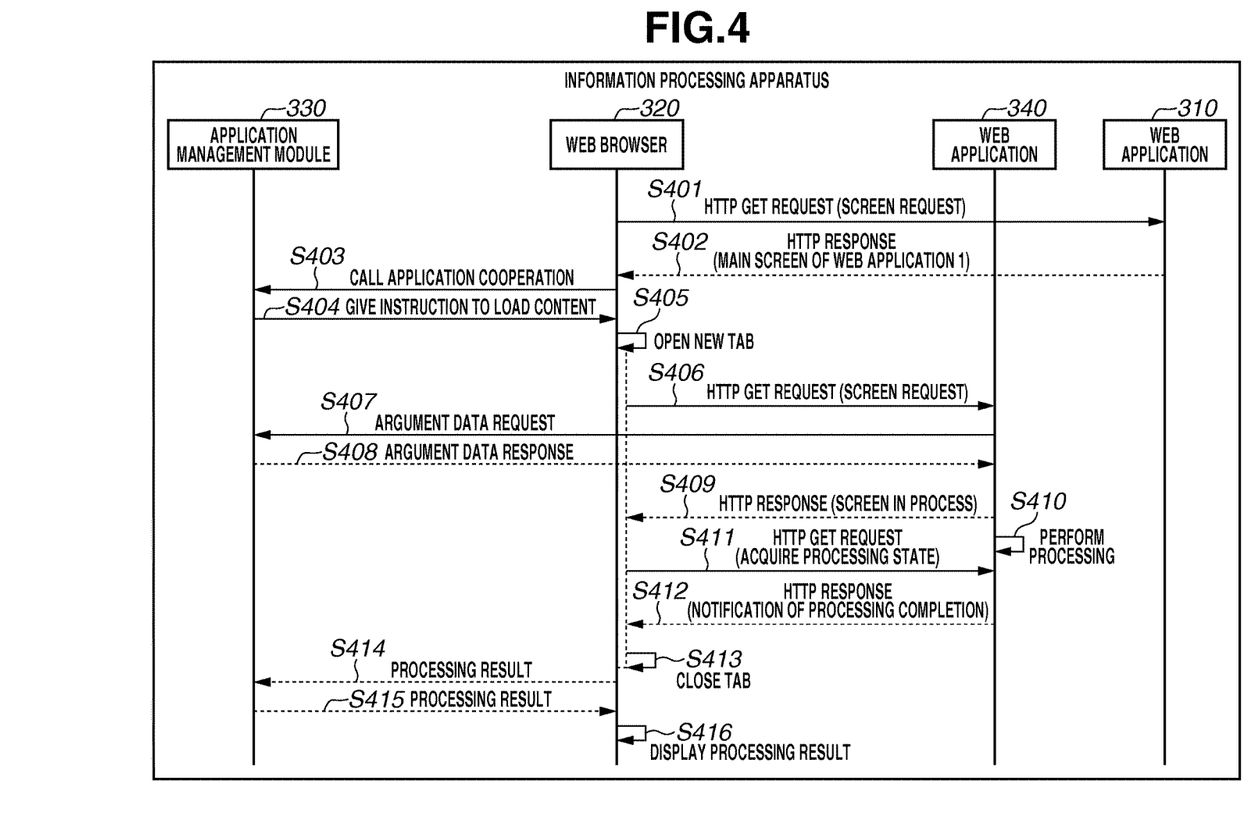
FIG. 4 is a sequence diagram in a case where a web application is called in a local environment.

FIG. 4 is a sequence diagram in a case where an application cooperation function operates only in the information processing apparatus 101. That is, FIG. 4 illustrates the flow of the processing in a case where an application cooperation function is used to cause the web application 340 and the web application 310 in the information processing apparatus 101 to cooperate. In the present exemplary embodiment, the web application 310 has a document management function, and the web application 340 has a print function using a function (not illustrated) specific to the information processing apparatus. The present exemplary embodiment, however, does not limit the function of each web application. Alternatively, each application may have any function.

First, in step S401, the user starts the web browser 320, and the web browser 320 accesses the web application 310. Specifically, the web browser 320 transmits a screen acquisition request by the GET method of the HTTP protocol to the web application 310 (a first application). Then, in step S402, the web application 310 returns as a response the content of a main screen of the web application 310 to the web browser 320. The web browser 320 receives the response returned in step S402 and displays the main screen of the web application 310 on the UI display device 205.

Figure 9:
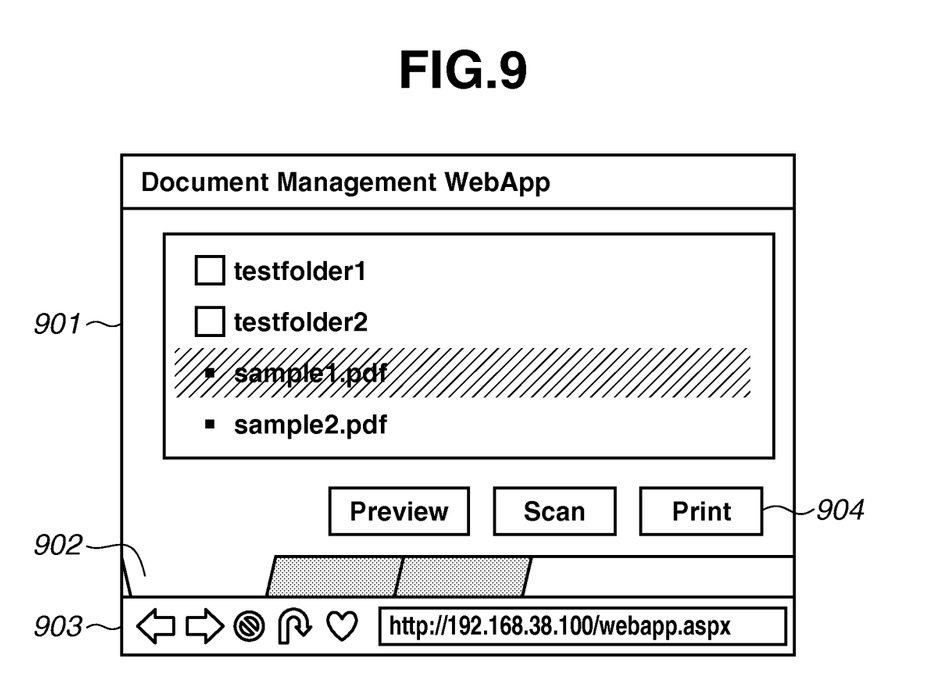
FIG. 9 is a diagram illustrating an example of a screen of a web application drawn in a content area.

FIG. 9 illustrates an example of the web browser 320 displaying the main screen of the web application 310. On the screen, a content area 901, a print button 904, a tab area 902, which displays the states of tabs, and a toolbar 903 for operating the web browser 320 are displayed. In the content area 901, the main screen of the web application 310 is displayed and includes the print button 904 for starting to print a document selected by the user.

Next, in step S403, the user presses the print button 904 displayed on the main screen, thereby executing the application cooperation function calling JavaScript (registered trademark) 1000 associated with the print button 904. Consequently, the processing unit 324 of the web browser 320 calls an application cooperation function of the cooperation control unit 332 of the application management module 330 (a holding unit). Here, a description of the flow of a case where a calling destination web application is explicitly specified as the web application 340 (a second application) is given. Alternatively, the user may be allowed to select a calling destination web application from several candidate applications. In the calling of the application cooperation function, the URL (specifying information) of the web application 340 as a calling destination web application and print data are transferred as argument data to the application management module 330.

Next, in step S404, according to a web application cooperation function calling request received in step S403, the cooperation control unit 332 saves the URL of the calling destination web application and the print data in the argument data management table 800. Then, the cooperation control unit 332 instructs the web browser 320 to open a new tab and load the content of the calling destination URL.

Next, in step S405, according to the instruction given in step S404, the web browser 320 opens a new tab and brings the opened tab into an active state. The states of the newly opened tab and the previous tab are displayed in the tab area 902. Then, in step S406, to load the content into the new tab opened in step S405, the web browser 320 (an issuance unit) transmits a screen request to the web application 340, which operates in the apparatus.

Next, if receiving the screen request from the web browser 320 in step S406, then in step S407, the web application 340 transmits an argument data acquisition request to the application management module 330. Specifically, the web application 340 transmits an argument data acquisition request to the application management module 330 from the application cooperation data acquisition unit 343 via an API provided by the association determination unit 331. At this time, the identifier of the web application 340 is transmitted together with the argument data acquisition request to the application management module 330.

This argument data acquisition request is achieved by directly calling a native code API without using communication via the HTTP protocol. Consequently, it is possible to expect access faster than the acquisition of the argument data using the HTTP protocol using JavaScript (registered trademark). Next, in step S408, according to the argument data acquisition request received in step S407, the cooperation control unit 332 associates the argument data to be returned to the web application 340 and returns the argument data as a response to the web application 340.

Figure 6:
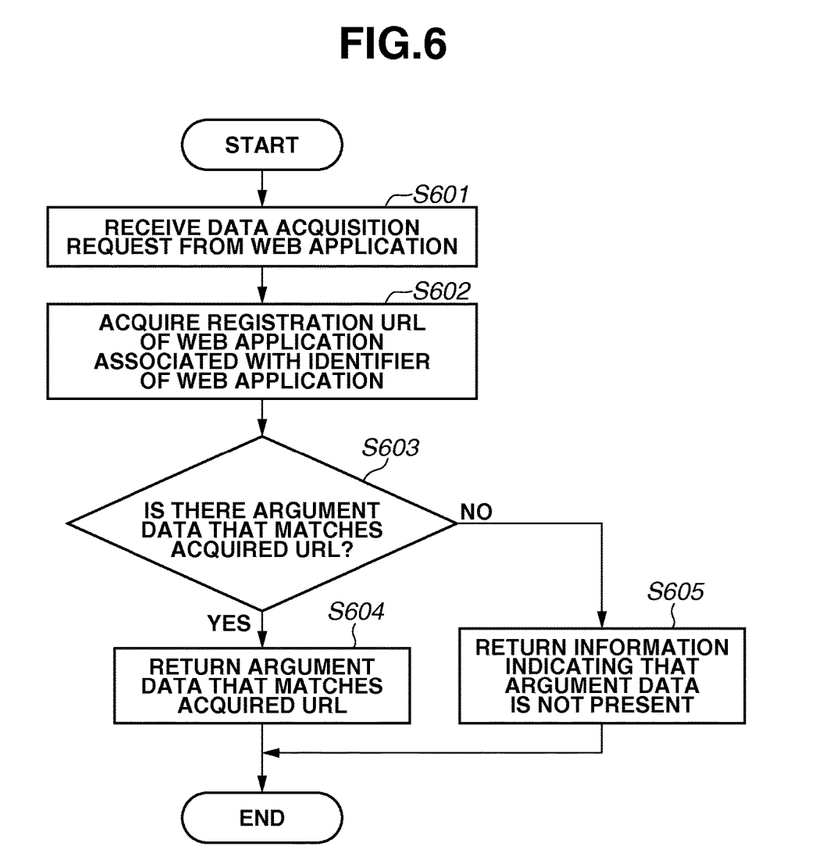
FIG. 6 is a flowchart illustrating a determination process by an application cooperation module.

FIG. 6 illustrates the flow of the association process by the application cooperation module 330. First, in step S601, the cooperation control unit 332 of the application cooperation module 330 receives an argument data acquisition request from the web application 340. At this time, the identifier of the web application 340 is transferred from the web application 340 to the cooperation control unit 332. Next, in step S602, the cooperation control unit 332 acquires from the web application registration information table 810 the registration URL of a web application that matches the identifier of the web application 340.

Next, in step S603, the cooperation control unit 332 determines whether the URL acquired in step S602 is present in the argument data management table 800. If the URL acquired in step S602 is present (YES in step S603), the processing proceeds to step S604. Then, in step S604, the cooperation control unit 332 returns, to web application 340, argument data corresponding to the URL acquired in step S602 and registered in the argument data management table 800. If, on the other hand, the URL acquired in step S602 is not present (NO in step S603), the processing proceeds to step S605. Then, in step S605, the cooperation control unit 332 returns, to the web browser 320 via the web application 340, information indicating that argument data corresponding to the URL acquired in step S602 is not present.

In the present exemplary embodiment, association is performed based on the identifier transferred from the web application 340. Alternatively, association may be performed by another method. For example, when the application management module 330 requests the web browser 320 to load the content in step S404, a unique ID for association may be attached to a query for the URL. In this case, when the web application 340 requests the application management module 330 to acquire an argument, a unique ID is attached, thereby performing association.

Referring back to FIG. 4, in step S409, the web application 340 returns the content of a screen in process to the web browser 320. The web browser 320 displays the received content on the UI display device 205. Then, in step S410, the web application 340 starts printing the print data received as the argument data in step S408.

Next, in step S411, the web browser 320 inquires of the web application 340 about whether the printing process is completed. Specifically, the inquiry is made using JavaScript (registered trademark) included in the content of the screen in process received in step S409. Then, in step S412, as a response to the inquiry received in step S411, the web application 340 notifies the web browser 320 of a printing completion state. If the printing is not completed, the process of inquiring whether the printing process is completed in step S411 is repeatedly performed at regular time intervals.

Next, in step S413, the web browser 320 closes the new tab opened in step S405. Then, in step S414, the web browser 320 returns the processing result of the web application 340 by the application cooperation to the application management module 330. In the present exemplary embodiment, the web browser 320 returns "ResultCode=OK", which indicates that the printing is successful as the processing result.

Next, in step S415, as a response to the calling of the application cooperation function in step S403, the application management module 330 transmits the processing result received in step S414 to the content of the web application 310. Then, in step S416, the content of the web application 310 operating on the web browser 320 displays the processing result by the application cooperation received in step S415.

In the present exemplary embodiment, the web application 310, which is a calling source web application, is present in the information processing apparatus 101, but may be a web application that operates on the network 100.

Figure 5:
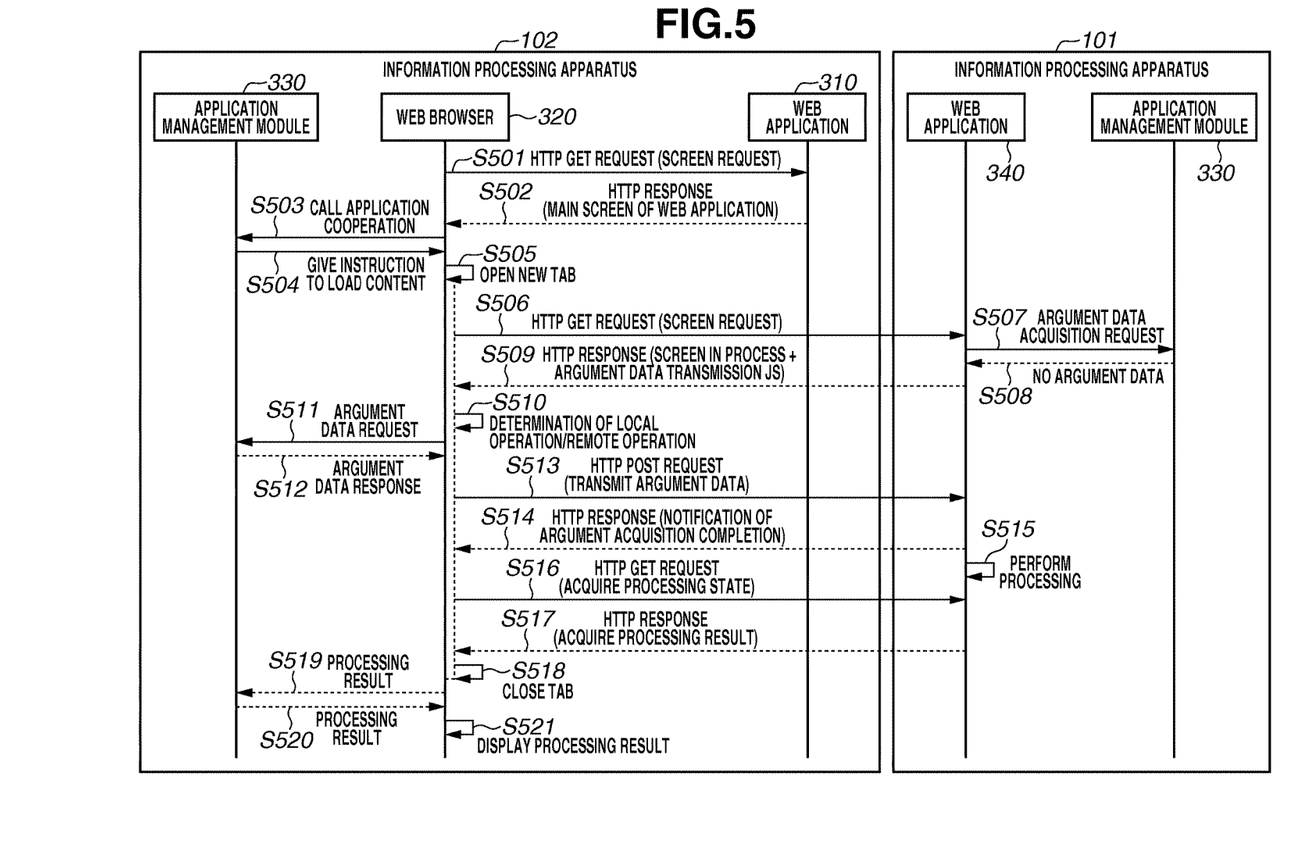
FIG. 5 is a sequence diagram in a case where a web application is called in a remote environment.

FIG. 5 is a sequence diagram in a case where the information processing apparatus 102 calls the web application 340 of the information processing apparatus 101, using a web application cooperation function. Similarly to the sequence diagram illustrated in FIG. 4, FIG. 5 illustrates the flow of the processing in a case where the web application 310 has a document management function, and the web application 340 has a print function using a function (not illustrated) specific to the information processing apparatus. The present exemplary embodiment, however, does not limit the function of each web application. Alternatively, each application may have any function.

Further, the information processing apparatus 102 according to the present exemplary embodiment is a mobile terminal typified by, for example, a smartphone. In the present exemplary embodiment, a description is given using an example where the information processing apparatus 102, which is a mobile terminal, calls an application cooperation function of the information processing apparatus 101, which has the print function. The present exemplary embodiment, however, does not limit the types of the information processing apparatuses. Alternatively, any types of information processing apparatuses may be used. For example, if the information processing apparatus 101 is an automobile having a communication function, examples of a possible use case include the acquisition of information from a mobile terminal to an in-car system by application cooperation, and a remote operation for locking the doors or controlling the door glass.

First, in step S501, the user operates the information processing apparatus 102 to start the web browser 320 of the information processing apparatus 102, and the web browser 320 of the information processing apparatus 102 accesses the web application 310 in the information processing apparatus 102. Specifically, the web browser 320 transmits a screen acquisition request by the GET method of the HTTP protocol to the web application 310.

Then, in step S502, the web application 310 of the information processing apparatus 102 returns the content of a main screen of the web application 310 to the web browser 320 of the information processing apparatus 102. The web browser 320 receives the response returned in step S502 and displays the main screen of the web application 310 on the UI display device 205. Further, the main screen includes the print button 904 for starting to print a document selected by the user.

Next, in step S503, the user presses the print button 904 displayed on the main screen, thereby executing on the browser the web application cooperation function calling JavaScript (registered trademark) 1000 associated with the print button 904. Consequently, the processing unit 324 of the web browser 320 of the information processing apparatus 102 calls an application cooperation function of the application management module 330 of the information processing apparatus 102. At this time, the URL of the web application 340 of the information processing apparatus 101 as a calling destination web application and print data are transferred as argument data to the application management module 330 of the information processing apparatus 102.

Next, in step S504, according to a received web application cooperation function calling request, the application cooperation module 330 of the information processing apparatus 102 saves the URL of the calling destination web application and the print data in the argument data management table 800. Then, the application cooperation module 330 of the information processing apparatus 102 instructs the web browser 320 of the information processing apparatus 102 to open a new tab and load the content of the calling destination URL.

Next, in step S505, according to the instruction given in step S504, the web browser 320 of the information processing apparatus 102 opens a new tab and brings the opened tab into an active state. The newly opened tab and the previous tab are displayed in the tab area 902. Then, in step S506, the web browser 320 of the information processing apparatus 102 transmits a screen request to the web application 340 of the information processing apparatus 101 from the new tab opened in step S505.

Next, in step S507, the web application 340 of the information processing apparatus 101 transmits an argument data acquisition request to the application management module 330 in the information processing apparatus 101 via the application cooperation data acquisition unit 343. Then, in step S508, according to the association process by the application cooperation module 330 illustrated in FIG. 6, the application cooperation module 330 of the information processing apparatus 101 associates the argument data to be returned to the web application 340. However, data corresponding to the web application 340 of the information processing apparatus 101 is not present in the argument data management table 800 of the cooperation module 330 of the information processing apparatus 101. Thus, the cooperation module 330 of the information processing apparatus 101 returns, to the web browser 320 of the information processing apparatus 102 via the web application 340, information indicating that the argument data is not present.

Next, in step S509, the web application 340 of the information processing apparatus 101 returns the content of a screen in process to the web browser 320 of the information processing apparatus 102. At this time, since the argument data is not present in step S508, the web application 340 of the information processing apparatus 101 includes the argument data transmission JavaScript (registered trademark) 1010 in the content of the screen in process. In the present exemplary embodiment, based on whether the argument data is present, it is determined whether to include the argument data transmission JavaScript (registered trademark) 1010 in the response. Alternatively, the web application 340 of the information processing apparatus 101 may always include the argument data transmission JavaScript (registered trademark) 1010 in the response.

Next, in step S510, the web browser 320 of the information processing apparatus 102 displays on a screen the content received in step S509 and executes the argument data transmission JavaScript (registered trademark) 1010 included in the content. The argument data transmission JavaScript (registered trademark) 1010 includes a location determination unit 1011 (described below). The location determination unit 1011 determines whether the address of the server on which the web application 340 operates is a local loopback address. Hereinafter, an environment where a web browser and a web application are connected together via a local loopback address is referred to as a "local loopback environment". In the present exemplary embodiment, the web browser 320 of the information processing apparatus 102 calls the web application 340 of the information processing apparatus 101. Thus, it is determined that the web application 340 does not operate in a local loopback environment.

Next, in step S511, receiving the determination that the web application 340 operates in a remote environment, the argument data transmission JavaScript (registered trademark) 1010 transmits an argument data acquisition request to the application management module 330. If the web application 340 operates in a local loopback environment, the argument data transmission JavaScript (registered trademark) 1010 does not make an argument data acquisition request.

Then, in step S512, according to the argument data acquisition request received in step S511, the application cooperation module 330 returns the argument data as a response. In the present exemplary embodiment, the print data is returned as the argument data. Next, in step S513, the argument data transmission JavaScript (registered trademark) 1010 transmits the argument data received in step S512 to the web application 340 of the information processing apparatus 101. The web application 340 of the information processing apparatus 101 causes the application cooperation data acquisition unit 343 to receive the argument data.

Figure 7:
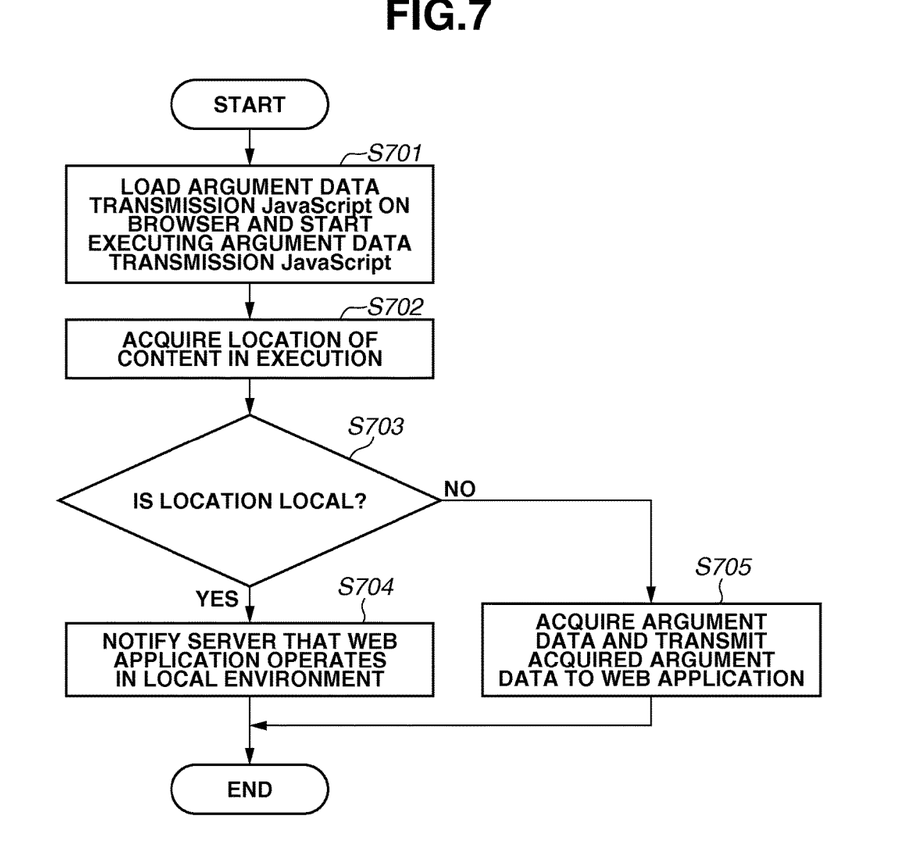
FIG. 7 is a flowchart illustrating processing of argument data transmission Script.

With reference to FIG. 7, a description of the flow of the processes, which is indicated in steps S510 to S513, of determining whether the address of the server on which the web application 340 operates is a local loopback address, and acquiring the argument data is here given. First, in step S701, the web browser 320 of the information processing apparatus 102 starts executing the argument data transmission JavaScript (registered trademark) 1010. Next, in step S702, the web browser 320 of the information processing apparatus 102 acquires the address of the server on which the web application 340 described in step S510 operates. That is, the web browser 320 of the information processing apparatus 102 acquires information of the location of the content in execution. Then, in step S703, the web browser 320 of the information processing apparatus 102 determines whether the address of the server on which the web application 340 described in step S510 operates is a local loopback environment.

If it is determined in step S703 that the address of the server on which the web application 340 operates is a local loopback environment (YES in step S703), the processing proceeds to step S704. Then, in step S704, the web browser 320 of the information processing apparatus 102 transmits, to the web application 340 of the information processing apparatus 101, information indicating that the web application 340 operates in a local loopback environment. In the present exemplary embodiment, the parameter "isLocal=true" is transmitted using the HTTP protocol. Further, the transmitted content is received by the application cooperation data acquisition unit 343 of the web application 340.

If, on the other hand, the address of the server on which the web application 340 operates is not a local loopback environment (NO in step S703), the processing proceeds to step S705. Then, in step S705, the web browser 320 of the information processing apparatus 102 acquires the argument data from the application management module 330 of the information processing apparatus 102 and transmits the argument data to the web application 340 of the information processing apparatus 101. The web application 340 causes the application cooperation data acquisition unit 343 to acquire the argument data.

Referring back to FIG. 5, in step S514, as a response, the web application 340 of the information processing apparatus 101 notifies the web browser 320 of the information processing apparatus 102 that the acquisition of the argument data is completed. Then, in step S515, the web application 340 of the information processing apparatus 101 prints the print data received as the argument data in step S514. In step S516, the web browser 320 of the information processing apparatus 102 inquires of the web application 340 of the information processing apparatus 101 about whether the printing process is completed. Specifically, the inquiry is made by the GET method of the HTTP protocol, using JavaScript (registered trademark) included in the content received in step S509.

Next, in step S517, in response to the inquiry received in step S516, the web application 340 of the information processing apparatus 101 notifies the web browser 320 of the information processing apparatus 102 of a printing completion state as the processing result. If the printing is not completed, the web application 340 returns the status of printing incompletion to the web browser 320. Then, the process of inquiring whether the printing process is completed, in step S516 is repeatedly performed at regular time intervals. Then, in step S518, the web browser 320 of the information processing apparatus 102 closes the new tab opened in step S505.

In step S519, the web browser 320 of the information processing apparatus 102 returns the processing result of the web application 340 of the information processing apparatus 101 by the application cooperation to the application management module 330 of the information processing apparatus 102. Then, in step S520, as a response to the calling of the application cooperation in step S503, the application management module 330 of the information processing apparatus 102 transmits the processing result received in step S519 to the web browser 320 of the information processing apparatus 102. Then, in step S521, the content of the web application 310 operating on the web browser 320 of the information processing apparatus 102 displays the processing result received in step S520.

FIGS. 8A and 8B are diagrams illustrating an example of the argument data management table 800 and the web application registration information table 810. FIG. 8A is a diagram illustrating an example of the argument data management table 800. A set of the URL of the calling destination of a predetermined application cooperation function and argument data associated with the URL is saved. Then, when the cooperation control unit 332 of the application management module 330 is called, the URL of the calling destination of the application cooperation function and the argument data are registered. Further, the argument data management table 800 is saved in the application information management unit 333.

FIG. 8B is a diagram illustrating an example of the web application registration information table 810. A set of a web application identifier and the URL of a web application is saved. This is registration information required for the operations of the web application 310 and the web application 340. In the present exemplary embodiment, it is assumed that the web application 310 and the web application 340 have started up in advance, and a web application identifier and the URL of a web application are saved in the web application registration information table 810. Further, the web application registration information table 810 is saved in the application information management unit 333.

Figure 10A:
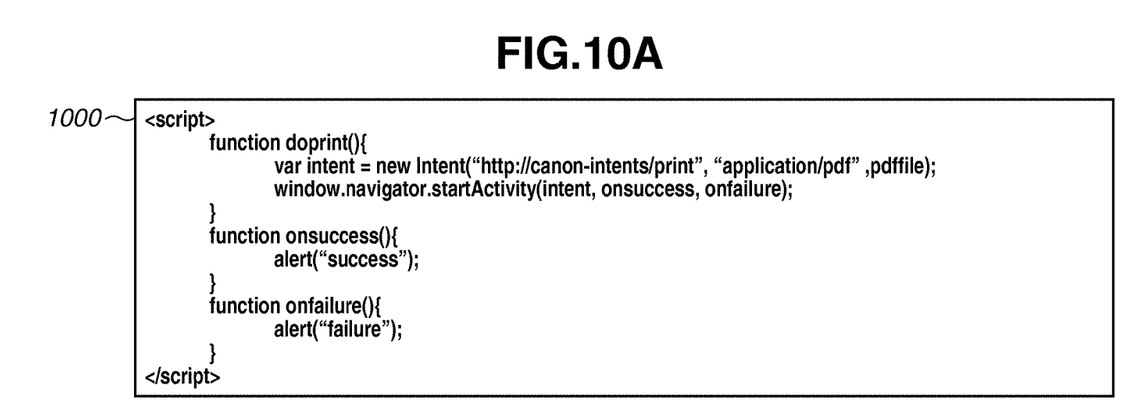
FIGS. 10A and 10B are diagrams illustrating examples of Script according to an exemplary embodiment of the present invention.
Figure 10B:
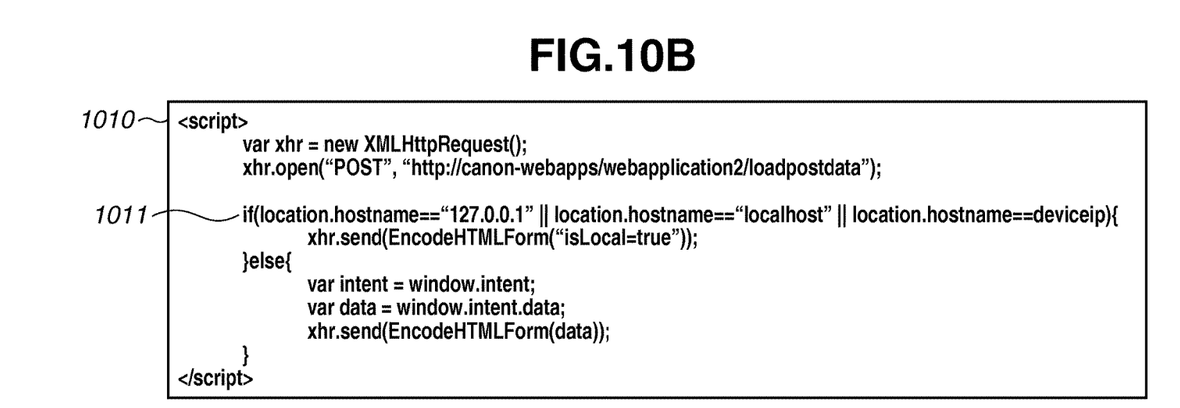

FIGS. 10A and 10B are diagrams illustrating examples of JavaScript (registered trademark) according to the present exemplary embodiment. FIG. 10A is a diagram illustrating an example of the application cooperation function calling JavaScript (registered trademark) 1000. The application cooperation function calling JavaScript (registered trademark) 1000 is executed to transfer the URL of a calling destination web application and argument data to the application management module 330 and call an application cooperation function. Further, if the application cooperation function ends, the processing result is displayed on a screen.

FIG. 10B is a diagram illustrating an example of the argument data transmission JavaScript (registered trademark) 1010. The argument data transmission JavaScript (registered trademark) 1010 includes the location determination unit 1011 and determines whether the address of the server on which a calling destination web application operates is a local loopback address. If the address of the server on which the calling destination web application operates is a local loopback address, "isLocal=true" is transmitted to the web application. If the address of the server on which the calling destination web application operates is not a local loopback address, argument data in application cooperation is acquired and transmitted to the calling destination web application.

While a description of the processing performed by an information processing apparatus serving as a calling source has been mainly given, a description of the processing performed by an information processing apparatus including a calling destination web application is here given. In this case, for example, if a cooperation function of another information processing apparatus on the network calls the web application, data is acquired from the calling source by communication via the HTTP protocol. This is because in this case, data related to specifying information is not locally managed, and therefore, it is necessary to acquire communication data via the HTTP protocol.

As described above, according to the present exemplary embodiment, a web application operating in a local loopback environment can acquire argument data in an application cooperation function directly from a module for providing the application cooperation function. That is, it is possible to provide an information processing apparatus capable of, if a web browser and a web application are present in the same device, acquiring argument data in an application cooperation function directly from a module for providing the application cooperation function. Consequently, it is possible to acquire argument data without using communication via the HTTP protocol through a web browser, and reduce processing cost.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-223681, filed Oct. 31, 2014, which is hereby incorporated by reference herein in its entirety.

What is claimed is:

1. An information processing apparatus having a web browser and a second application, the information processing apparatus comprising:
a memory storing instructions related to a cooperation function for causing a first application and the second application to cooperate; and
a processor executing the instructions causing the information processing apparatus to:
receive, from the web browser, data to be acquired by the second application and specifying information corresponding to the second application, in a case where an instruction to call the second application is performed via a screen of the first application displayed by using the web browser;
hold the received data in association with the received specifying information;
receive a data acquisition request from the second application without using communication via Hypertext Transfer Protocol (HTTP), wherein the data acquisition request includes an identifier of the second application; and
return, to the second application without using the communication via the HTTP, the data held in association with the specifying information corresponding to the second application based on the data acquisition request,
wherein the data acquisition request is performed by the second application according to a HTTP request which the web browser has executed for the second application based on the instruction to call the second application, and
wherein, when processing of the returned data is executed by the second application, a HTTP response related to the processing of the returned data is performed from the second application to the web browser.

2. The information processing apparatus according to claim 1, wherein the specifying information includes at least part of a URL for calling the second application.

3. The information processing apparatus according to claim 1, wherein the cooperation function is provided by part of an OS that operates on the information processing apparatus.

4. The information processing apparatus according to claim 1, wherein the information processing apparatus is at least any of an image forming apparatus, an in-car automotive navigation system, a smartphone, and a robot.

5. A method for causing a first application and a second application to cooperate, wherein the second application operates in an information processing apparatus, the method comprising:
receiving, from a web browser operating in the information processing apparatus, data to be acquired by the second application and specifying information corresponding to the second application, in a case where an instruction to call the second application is performed via a screen of the first application displayed by using the web browser;
holding the received data in association with the received specifying information;
receiving a data acquisition request from the second application without using communication via Hypertext Transfer Protocol (HTTP), wherein the data acquisition request includes an identifier of the second application; and
returning, to the second application without using the communication via the HTTP, the data held in association with the specifying information corresponding to the second application based on the data acquisition request,
wherein the data acquisition request is performed by the second application according to a HTTP request which the web browser has executed for the second application based on the instruction to call the second application, and
wherein, when processing of the returned data is executed by the second application, a HTTP response related to the processing of the returned data is performed from the second application to the web browser.

6. A non-transitory computer readable storage medium on which is stored a computer program for making a computer execute a method for causing a first application and a second application to cooperate, wherein the second application operates in an information processing apparatus, the method comprising:
receiving, from a web browser operating in the information processing apparatus, data to be acquired by the second application and specifying information corresponding to the second application, in a case where an instruction to call the second application is performed via a screen of the first application displayed by using the web browser;
holding the received data in association with the received specifying information;

receiving a data acquisition request from the second application without using communication via Hypertext Transfer Protocol (HTTP), wherein the data acquisition request includes an identifier of the second application; and returning, to the second application without using the communication via the HTTP, the data held in association with the specifying information corresponding to the second application based on the data acquisition request, wherein the data acquisition request is performed by the second application according to a HTTP request which the web browser has executed for the second application based on the instruction to call the second application, and wherein, when processing of the returned data is executed by the second application, a HTTP response related to the processing of the returned data is performed from the second application to the web browser.

7. The information processing apparatus according to claim 1, wherein the first application is operated not on the information processing apparatus but on a network.

8. The information processing apparatus according to claim 1, wherein the instructions causing the information processing apparatus to:

receive, from the web browser, data to be acquired by a web application, different from the second application, on a network and specifying information corresponding to the web application, in a case where an instruction to call the web application is performed via the screen of the first application displayed by using the web browser;

hold the received data in association with the received specifying information;

receive a data acquisition request from the web browser; and return, to the web browser, the data held in association with the specifying information corresponding to the web application based on the data acquisition request, wherein the web browser transmits the returned data to the web application as a HTTP request.

* * * * *